United States Patent

Berger et al.

[11] Patent Number: 5,758,263
[45] Date of Patent: May 26, 1998

[54] SELECTION OF COMMUNICATION CHANNEL IN A DIGITAL CORDLESS TELEPHONE

[75] Inventors: Douglas M. Berger, Mission Viejo; John S. Walley, Lake Forest, both of Calif.

[73] Assignee: Rockwell International Corporation, Newport Beach, Calif.

[21] Appl. No.: 568,871

[22] Filed: Dec. 7, 1995

[51] Int. Cl.$^6$ ....................................... H04B 17/00
[52] U.S. Cl. ...................... 455/67.4; 455/126; 455/161.1
[58] Field of Search ......................... 455/33.1, 54.1, 455/56.1, 67.1, 67.4, 126, 127, 134, 161.3, 161.1, 226.2, 226.1, 34.1, 502, 507, 510, 515, 517, 509, 512; 379/58, 60, 61, 102.7, 100.6

[56] References Cited

U.S. PATENT DOCUMENTS

| | | | |
|---|---|---|---|
| 4,481,640 | 11/1984 | Chow et al. | 375/1 |
| 4,724,435 | 2/1988 | Moses et al. | 340/870 |
| 4,804,938 | 2/1989 | Rouse et al. | 340/310 |
| 5,014,295 | 5/1991 | Kunihiro | 379/61 |
| 5,042,050 | 8/1991 | Owen | 375/1 |
| 5,077,753 | 12/1991 | Grau, Jr. et al. | 375/1 |
| 5,103,459 | 4/1992 | Gilhousen et al. | 375/1 |
| 5,150,377 | 9/1992 | Vannucci | 375/1 |
| 5,218,630 | 6/1993 | Patsiokas et al. | 379/59 |
| 5,280,472 | 1/1994 | Gilhousen | 370/18 |
| 5,309,474 | 5/1994 | Gilhousen et al. | 375/1 |
| 5,327,578 | 7/1994 | Breeden et al. | 455/34.2 |
| 5,335,362 | 8/1994 | Vaisanen et al. | 455/186.1 |
| 5,345,597 | 9/1994 | Strawczynski et al. | 455/34.1 |
| 5,351,270 | 9/1994 | Graham et al. | 375/1 |
| 5,353,341 | 10/1994 | Gillis et al. | 379/61 |
| 5,375,140 | 12/1994 | Bustamante et al. | 375/1 |
| 5,416,797 | 5/1995 | Gilhousen et al. | 375/705 |
| 5,535,440 | 7/1996 | Clappier | 455/134 |

*Primary Examiner*—Reinhard J. Eisenzopf
*Assistant Examiner*—Darnell R. Armstrong
*Attorney, Agent, or Firm*—James P. O'Shaughnessy; William C. Cray

[57] ABSTRACT

A method for testing a communication link between first and second components of a system, which components communicate via a selected one of a plurality of broadcast channels, the second component being powered by a self-contained power source, the method comprising: causing the first component to scan a plurality of the broadcast channels in sequence in a receiving mode during a scanning period and to broadcast a test signal over the selected channel during the scan; and maintaining the second component in an inactive state in which energy consumption is minimized and in which the second component is unresponsive to broadcast signals during a major part of the scanning period, placing the second component in an active state in which the second component can detect the test signal during a time when the test signal is being broadcast, and causing the second component to broadcast a response signal upon detection of the test signal.

3 Claims, 3 Drawing Sheets

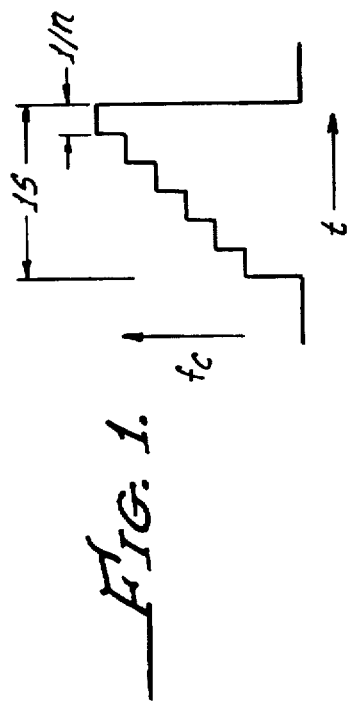
Fig. 1.
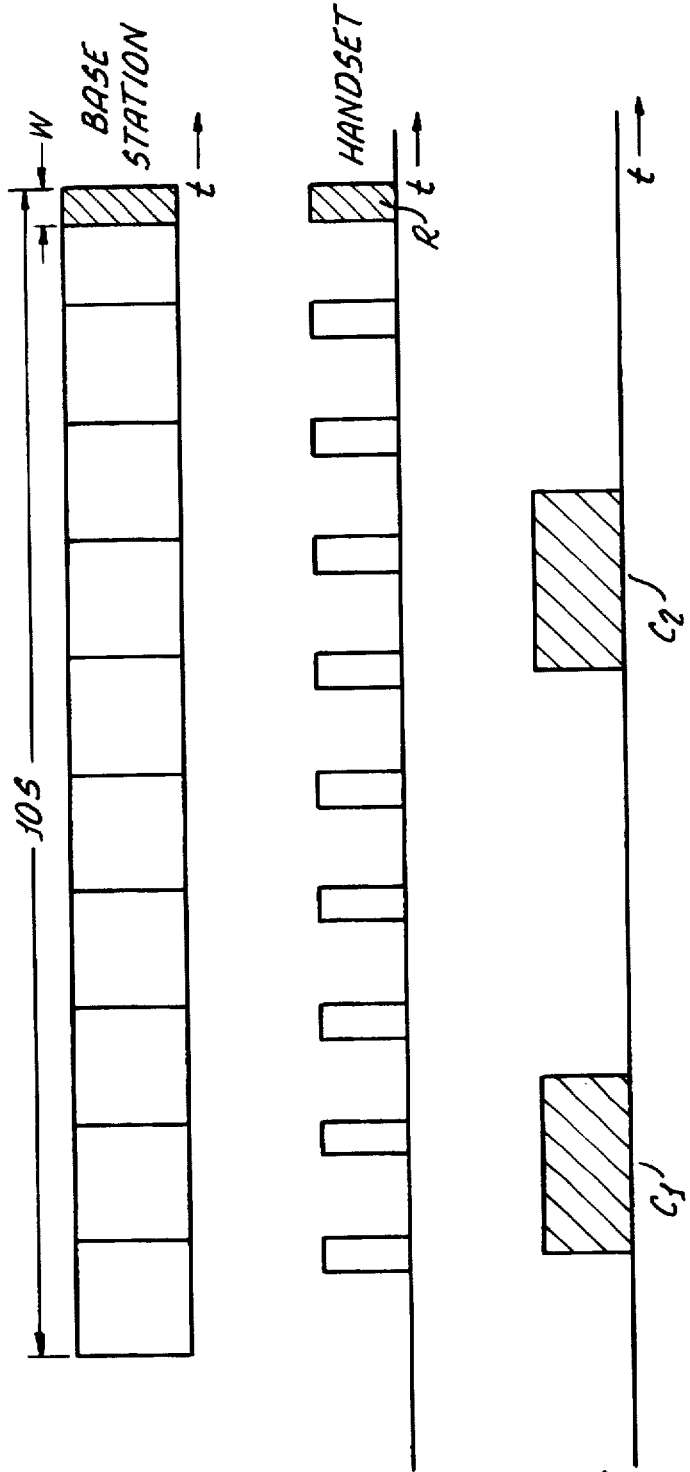
Fig. 2a.
Fig. 2b.
Fig. 2c.

SELECTION OF COMMUNICATION CHANNEL IN A DIGITAL CORDLESS TELEPHONE

BACKGROUND OF THE INVENTION

The present invention relates to the operation of digital cordless telephones (DCTs), and particularly the selection of a communications channel in a DCT.

A DCT is composed of a base station which is wired to a telephone line and a handset which communicates with the base station via a broadcast channel. For various reasons, it has been found desirable to allow communication to take place over a selected one of a plurality of available channels, the selected channel being one which is relatively free of interference. DCTs now on the market have a manual switching capability to allow a user to switch from a channel which contains interference. It has been observed that interference is particularly likely to occur in the ISM, or 900 MHz, band since this band is relatively unregulated and is used for a variety of purposes.

The primary benefit offered by a DCT is the convenience of a handset that can be located some distance from its base station. This requires, of course, that the handset be powered by batteries.

In the case of virtually any battery powered electronic equipment, a desideratum is to prolong battery life as much as possible, and this is true of a DCT handset.

During periods when a DCT is not in use, it is in a standby mode. In this mode, the handset circuitry is in a minimum energy consumption state, or "sleep state" most of the time and is caused to periodically assume an active state, i.e. it "wakes up", during brief intervals to detect any communication, such as those relating to incoming calls, from the base station. For example, the handset circuitry may wake up at one-second intervals to check several channels for an incoming call.

In known digital cordless telephone systems, a test is performed periodically, for example once every ten seconds, to determine whether the handset is within the range of the base station. This is known as an out-of-range-test, or protocol.

In addition, the handset circuitry can be controlled to scan several channels for an incoming call when in the standby mode. Known operations of this type produce a significant battery drain.

SUMMARY OF THE INVENTION

It is an object of the present invention to perform channel selection in a DCT in a manner to minimize battery drain.

Another object of the invention is to perform an out-of-range test with minimum battery drain.

A further object of the invention is to identify the best communication channel in an improved manner.

An additional object of the invention is to make possible provision of a handset out-of-range indication at both the handset and the base station of a DCT.

Still another object of the invention is to effect channel testing and selection in a manner which minimizes interference with other systems operating in the same band.

The above and other objects are achieved, according to the invention, by a method for testing a communication link between first and second components of a system, which components communicate via a selected one of a plurality of broadcast channels, the second component being powered by a self-contained power source, the method comprising: causing the first component to scan some or all of the broadcast channels in sequence in a receiving mode during a scanning period and to broadcast a test signal over the selected channel during the scan; and maintaining the second component in an inactive state in which energy consumption is minimized and in which the second component is unresponsive to broadcast signals during a major part of the scanning period, placing the second component in an active state in which the second component can detect the test signal during a time when the test signal is being broadcast, and causing the second component to broadcast a response signal upon detection of the test signal.

Objects according to the invention are further achieved by performing the above-described method in combination with a method for selecting a new broadcast channel when the selected channel is not detected by the second component, the method for selecting a new broadcast channel comprising: causing the second component to transmit a second test signal over a second broadcast channel different from the selected channel during a scanning period so that the second test signal can be received at the first component; and tuning the first component to broadcast over the second broadcast channel when the second test signal is detected at the first component.

Objects according to the invention are further achieved by a method for selecting a communications channel between first and second components of a system in which the components can communicate over a selected one of a plurality of channels, the first component having a receiving channel which employs automatic gain control, the method comprising monitoring signal strength at the first component in a plurality of the channels when the second component is not transmitting in any of those channels; and identifying that one of the plurality of channels which has the lowest signal strength; and using the identified channel as the communication channel between the first and second components.

BRIEF DESCRIPTION OF THE DRAWING

FIG. 1 is a waveform showing a scanning period in the operation of a digital cordless telephone.

FIGS. 2a, 2b and 2c are signal diagrams illustrating channel testing and error recovery procedures according to the invention.

DESCRIPTION OF THE PREFERRED EMBODIMENTS

The following description is directed to application of the invention to DCTS.

The present invention allows a good communication link to be maintained between two system components while reducing the energy consumed by the component that is powered by a self-contained power source. This beneficial result is surprising since the procedure according to the present invention requires periodic signal transmissions by the latter component. This procedure is performed whenever the system is in its standby mode.

In the standby mode, the base station of a DCT operating according to the invention cyclically scans all handset transmission channels in a listening mode. One scanning period is represented by the frequency vs. time diagram shown in FIG. 1. During one scanning period, which may have a duration of 1 second, the base station scans all possible handset transmission channels, being tuned to each transmission channel carrier frequency, fc, for an interval of 1/n second, where n is the number of handset transmission channels.

Figure 3A:
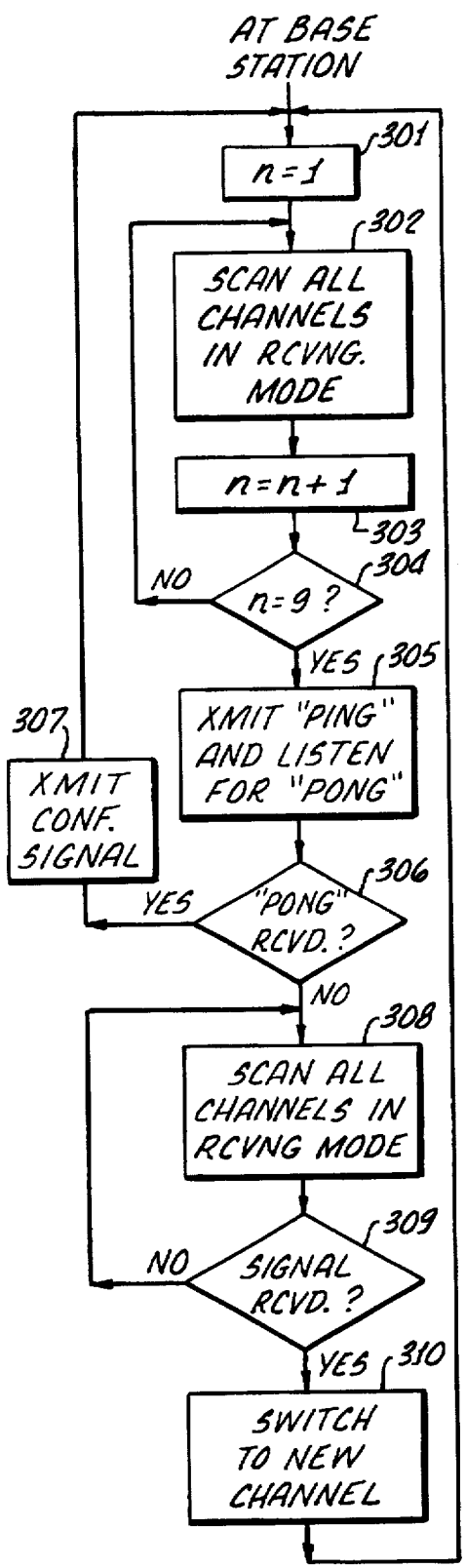
FIGS. 3a and 3b are programming diagrams showing testing procedures according to the invention.
Figure 3B:
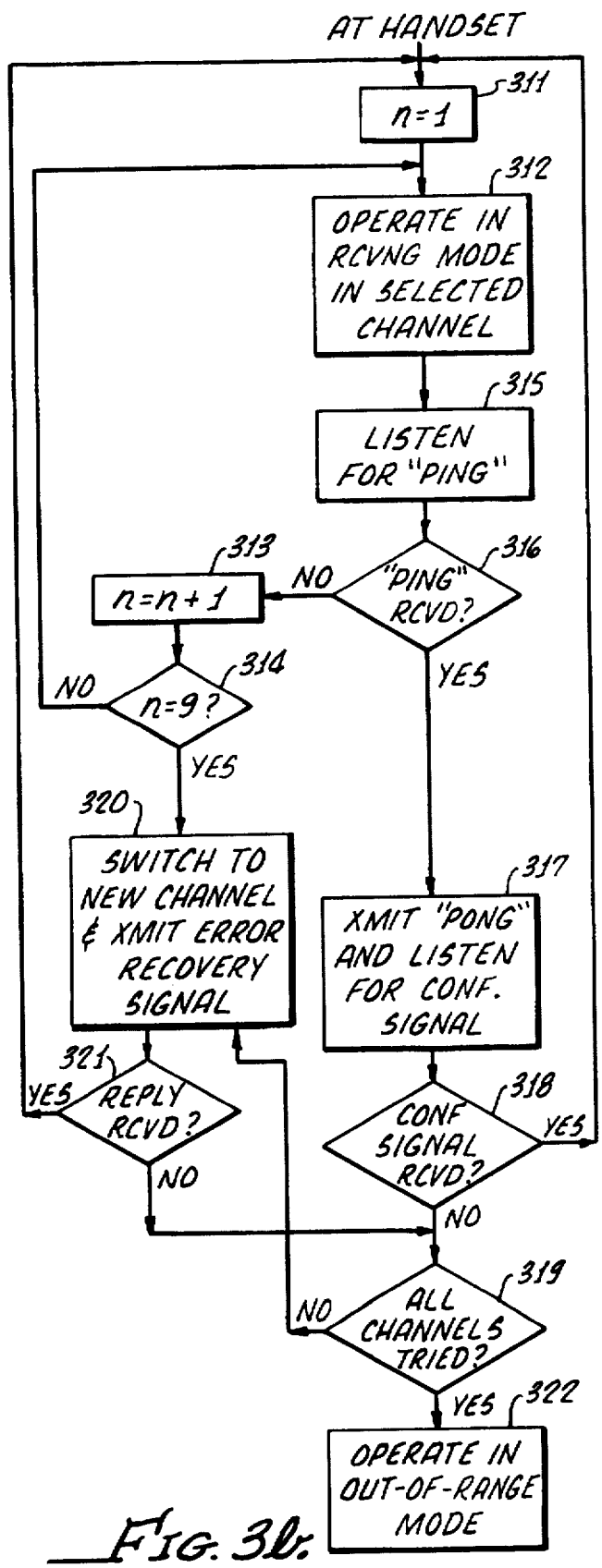

FIGS. 2a and 2b depict communication signals at the base station and handset, respectively, during a succession of the periods of FIG. 1, while FIGS. 3a and 3b show the test procedures performed with these signals. For example, FIG. 2a illustrated 10 of the periods of FIG. 1, and these 10 periods represent one out-of-range test cycle. FIG. 2b depicts handset operation during this period. During the course of each base station scanning period (FIG. 3a, steps 301–304), the handset "wakes up" during the interval associated with the presently selected channel and operates in the receiving mode to detect any signal that may be transmitted by the base station (FIG. 3b, steps 311, 312). The wake up periods of the handset are shown by unhatched pulses in FIG. 2b.

The out-of-range test, or protocol, begins with a signal in the channel to which the handset is tuned, transmitted by the base station during a timing window, w, which covers one channel with allowance for timing errors in the handset circuitry (step 305). This occurs once during each out-of-range test cycle. More specifically, the timing window has a duration of approximately 1/n second and assures that the transmitted signal will coincide in time with the period during which the handset is in the receiving mode. During each timing window, w, the handset wakes up and responds to reception of the transmission from the base station with a return signal, R (steps 313–317). The transmission from the base station is a "ping" and the response from the handset is a "pong".

According to the invention, each ping is a test signal or channel maintenance signal sent only over the currently selected channel and thus during a short period when the base station is scanning that channel. This test signal can be in the form of an acquisition frame containing data. Each pong is a return or verification signal over the same channel and this signal can be of very short duration, for example of the order of 2 ms. This return signal is emitted by the handset (step 317) when the test signal is received in a form which indicates that a good communication link exists between the base station and the handset. The return signal can be in the form of an acquisition frame containing data and may or may not be identical to the test signal. Then, according to preferred embodiments of the invention, the base station responds to receipt of the return signal (step 306) by emitting a confirmation signal (step 307). If the handset receives the confirmation signal (step 318), operation returns to start a new cycle.

At the base station, receipt of the return signal enables the base station to conclude that a good communication link exists. At the handset, receipt of the confirmation signal enables the handset to conclude that a good communication link exists. As a result, information is available at both components to indicate a handset out-of-range condition when the component does not receive a respective one of the return and confirmation signals.

If the handset does not receive a ping, or a confirmation signal, or determines that a parameter of the ping, or confirmation signal, such as signal strength, has a value indicating that communication cannot take place, it does not emit a return signal and the system enters an error recovery mode (step 320). The purpose of the error recovery mode is to switch to a different channel which permits good communication between the handset and the base station, or to provide an out-of-range indication at the handset.

In the error recovery mode, as shown in FIG. 2c, the handset selects a channel $C_1$ different from the channel to which the components were previously tuned and broadcasts a channel test signal or error recovery signal over that channel for a period equal to at least one channel scanning period of the base station (step 320). Therefore, the error recovery signal can be detected at the base station (step 302, or 308) during the interval when the base station is tuned to receive the selected channel. If that signal is properly received at the base station in a form which indicates that the channel is good and that the handset is not out of range, the base station can switch to the selected channel as the new communication channel (steps 309, 310) and during the interval when the base station is tuned to the channel over which the error recovery signal was sent, the base station emits a suitable reply signal.

If this signal is properly received at the handset (step 321), then, in the new channel $C_1$, the base station and handset can return to the standby mode and exchange test, return and confirmation signals, as described above.

If the error recovery signal broadcast over the first different channel $C_1$ does not produce an indication of a good channel, the handset will switch to another channel $C_2$ and repeat the error recovery procedure (steps 319, 321).

If, after all or a selected number of channels have been tested in the error recovery mode, no channel is found to be good, an out-of-range indication is produced at the handset (step 322) and can also be produced at the base station, as described above. As long as this condition exists, the handset periodically transmits a "request message" signal and the base unit scans in a listening mode (steps 308–310). When the base station receives the request message signal in a particular channel, it can initiate the above described out-of-range test in that channel.

An out-of-range test according to the invention can utilize only a test signal and a return signal. In this case, an out-of-range indication could not be provided at the handset. The signals transmitted during each test cycle, whether consisting of a test signal, a return signal and a confirmation signal, or simply a test signal and a return signal, are known collectively as a heartbeat.

The interval between heartbeats in the standby mode and the interval between emission of error recovery signals in the error recovery mode can be selected to achieve a desired compromise between power consumption and error recovery speed. The number of channels tested during error recovery before or after an out-of-range indication is produced can be selected to achieve a desired compromise between power consumption and probability of error recovery.

The channel test according to the present invention results in reduced handset battery drain, compared to prior art testing techniques, even though it requires a periodic signal transmission by the handset. This improvement is due primarily to the shortness of each period when the handset must be awake and the shortness of each transmission from the handset over a single channel at least as long as the present channel is good.

In addition, the procedure according to the invention reduces interfering radiation produced by the system because during any given out-of-range test cycle transmission occurs in only one channel and with a low duty cycle.

The error recovery procedure is implemented at start-up of the system, when no channel has been preselected. Alternatively, the base station and the handset can be calibrated through a physical connection, e.g. when the handset is physically mounted on, and plugged into, the base station.

In further accordance with the invention, the error recovery protocol is used to identify the best channel to use. This involves having the base station scan all channels, for example with the scanning pattern shown in FIG. 1, and determine the received signal strength, RSSI, on each channel which is not carrying a signal. The channel with the lowest received signal strength is the channel with the least amount of interference and thus the clearest channel. Signal strength can be determined by measuring an AGC signal in the base station receiving circuitry. In any receiving circuit having AGC, there will be an AGC voltage which varies monotonically with input signal magnitude. Thus, the AGC voltage can be measured when the base station is tuned to each channel and the handset is not transmitting, the measured values for the different channels can be compared and the channel whose AGC voltage corresponds to the lowest received signal strength can be designated as the clearest channel on which future communication is to occur. Based on such designation, the base station can add to its test signal, or ping, a code identifying the best channel, in response to which the handset will then tune itself to that channel.

Due to the bursty nature of noise from channel hopping and TDD systems, the RSSI is derived from a peak channel power measured over each scan interval for each channel. The measured values are then time filtered to reduce the impact of frequency hopping systems and a channel selection decision is made before each out-of-range test, or heartbeat.

Figure 4:
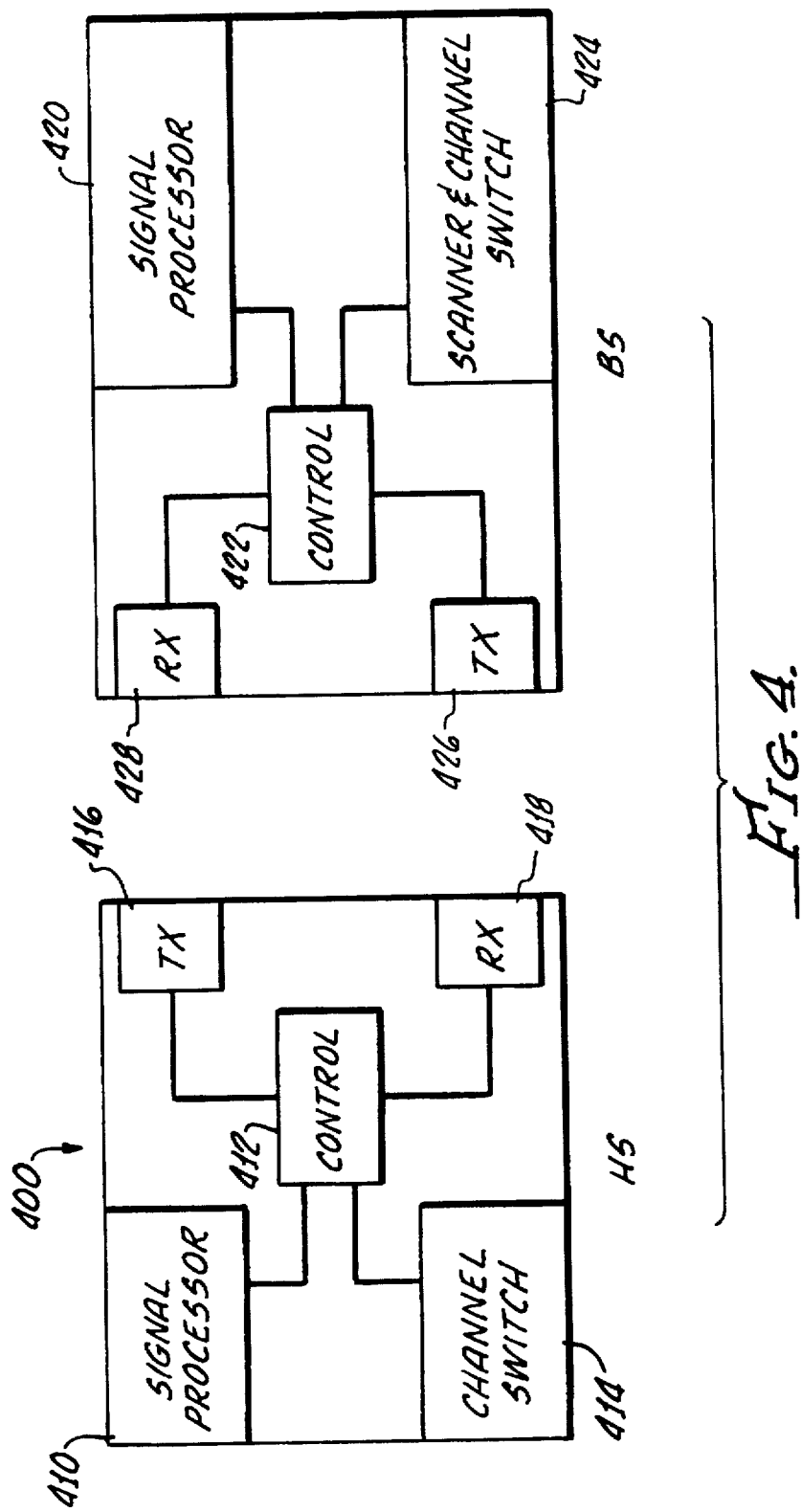
FIG. 4 is a block diagram of a system to which the invention may be applied.

The present invention will be implemented by providing the controllers of a state-of-the-art DCT handset and base station with appropriate firmware and/or software. To facilitate visualization of a system to which the invention can be applied, FIG. 4 shows the basic elements of a DCT composed of a handset 400 and a base station 402.

Handset 400 includes, inter alia, a signal processor 410, a controller 412, a channel switch 414, a transmitter 416 and a receiver 418. Base station 402 includes, inter alia, a signal processor 420, a controller 422, a scanner and channel switch 424, a transmitter 426 and a receiver 428. As is known in the art, elements such as 410, 412 and 414 in handset 400, or 420, 422 and 424 in base station 402 can be constituted structurally by a microprocessor, memory and suitable programming. All of the channel switching and scanning operations described above will be controlled by elements 414 and 424 in cooperation with controllers 412 and 422.

It should be readily apparent that the present invention can be implemented in any state of the art digital cordless telephone. In order to configure such a telephone to operate according to the invention, it is only necessary to suitably modify its firmware and/or software in a manner which would be readily apparent to those skilled in the art based on the present disclosure.

Within the scope of the invention, the handset and base station can exchange roles so that the operations shown in FIG. 3a would be performed at the handset and those shown in FIG. 3b would be performed at the base station.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A low-power method for frequently enabling while less frequently testing a communication link between first and second components of a system over a selected channel, which components communicate via a selected one of a plurality of broadcast channels, the second component being powered by a self-contained power source, said method comprising:

the second component maintaining an inactive state in which energy consumption is minimized and in which the second component is unresponsive to broadcast signals during a major part of successive scanning periods, each scanning period comprising a plurality of time intervals corresponding to the plurality of broadcast channels, a selected one of the plurality of time intervals corresponding to the selected channel;

second component periodically entering an active state during the selected time interval corresponding to the selected channel during each of the successive scanning periods in order to detect a communication from the first component with minimum energy consumption by periodically monitoring only the selected channel;

the first component periodically broadcasting a channel maintenance signal over the selected channel during a particular one of a plurality of successive scanning periods;

the second component detecting the channel maintenance signal when the channel maintenance signal is being broadcast by the first component during the particular one of the plurality of scanning periods;

the second component broadcasting a response signal upon detection of the channel maintenance signal during the particular one of the plurality of scanning periods; and the first component detecting the response signal broadcast by the second component and, based thereon, maintaining the selected channel whereby the second component may continue to monitor only the selected channel when it periodically enters an active state.

2. A method as defined in claim 1, comprising the further step of the first component responding to a reception of the response signal by broadcasting a confirmation signal while the second component is in the active state.

3. A method as defined in claim 1 in combination with a method for selecting a new broadcast channel when the channel maintenance signal periodically broadcast by the first component on the selected channel is not detected by the second component, said method for selecting a new broadcast channel comprising the steps of:

the first component scanning the plurality of broadcast channels for transmissions from the second component during the corresponding plurality of time intervals during successive scanning periods;

the second component transmitting a channel test signal over a second broadcast channel different from the selected channel throughout at least a scanning period so that the channel test signal can be received at the first component; and the first component making the second broadcast channel the selected channel when the channel test signal is detected at the first component.

\* \* \* \* \*